US012653754B2

(12) United States Patent
Gäbele

(10) Patent No.: US 12,653,754 B2
(45) Date of Patent: Jun. 16, 2026

(54) SAUNA AND METHOD FOR PERFORMING AN AUTOMATIC INFUSION CEREMONY FOR A SAUNA

(71) Applicant: Klafs GmbH, Schwäbisch Hall (DE)

(72) Inventor: Markus Gäbele, Schwäbisch Hall (DE)

(73) Assignee: Klafs GmbH, Schwäbisch Hall (DE)

( * ) Notice: Subject to any disclaimer, the term of this patent is extended or adjusted under 35 U.S.C. 154(b) by 211 days.

(21) Appl. No.: 18/388,354

(22) Filed: Nov. 9, 2023

(65) Prior Publication Data

US 2024/0415734 A1 Dec. 19, 2024

(30) Foreign Application Priority Data

Jun. 16, 2023 (EP) .................................... 23179723

(51) Int. Cl.
*A61H 33/06* (2006.01)

(52) U.S. Cl.
CPC ..... *A61H 33/067* (2013.01); *A61H 2033/068* (2013.01)

(58) Field of Classification Search
CPC ............ A61H 33/067; A61H 2033/068; A61H 2033/68
USPC .............................................................. 4/524
See application file for complete search history.

(56) References Cited

U.S. PATENT DOCUMENTS 6,842,997 B1 * 1/2005 Fratello .................. B60S 3/002 34/418

FOREIGN PATENT DOCUMENTS

| | | | |
|---|---|---|---|
| DE | 19535293 A1 | 3/1997 | |
| DE | 102011120925 A1 | 6/2013 | |
| DE | 102013019244 A1 | 5/2015 | |
| EP | 0287106 B1 | 3/1992 | |
| EP | 2092926 A1 | 8/2009 | |
| JP | 4801280 B2 | 10/2011 | |
| WO | WO-2007105492 A1 * | 9/2007 | ........... A61H 33/063 |

OTHER PUBLICATIONS

Translation of WO-2007105492-A1 (Year: 2007).*

* cited by examiner

*Primary Examiner* — Lauren A Crane
(74) *Attorney, Agent, or Firm* — Husch Blackwell LLP

(57) ABSTRACT

The present disclosure relates to a sauna with a sauna cabin and a sauna heater, which has at least one nozzle on or in a wall or ceiling of the sauna cabin and a compressed air supply. The nozzle and the compressed air supply are adapted such that compressed air from the compressed air supply can be blown into the sauna cabin via the at least one nozzle. In addition, the disclosure relates to a method for performing an automatic infusion ceremony for such a sauna.

17 Claims, 4 Drawing Sheets

SAUNA AND METHOD FOR PERFORMING AN AUTOMATIC INFUSION CEREMONY FOR A SAUNA

CROSS-REFERENCE TO RELATED APPLICATION

This application claims priority to and the benefit of European Patent Application No. 23179723.4, filed on Jun. 16, 2023, and entitled "Sauna and Method for Performing an Automatic Infusion Ceremony for a Sauna" which is herein incorporated by reference.

BACKGROUND

1. Field

The present disclosure is related generally to commercial saunas.

2. Related Art

In the operation of commercial saunas, one of the biggest cost factors is the provision of a sufficient number of sauna masters to perform the infusion ceremonies desired by the customers. The problem is that due to the special working conditions at the high temperatures prevailing in saunas, special working time regulations apply, which require a very high personnel requirement.

In order to relieve the sauna masters, there are automatic infusion devices in the prior art, as shown in DE 10 2011 120 925 A1, which automatically distribute infusion liquid over a stone bed of a sauna heater. In addition, there are distributors of moist sauna air that distribute the air in the sauna cabin via blowers or fans, as shown in DE 10 2013 019 244 A1, after an infusion.

However, the known solutions, especially for air distribution after a sauna infusion, are not satisfactory for commercially operated saunas in terms of the sauna experience and thus cannot reduce the workload of the sauna masters.

SUMMARY

The problem of the present disclosure is to provide a sauna which improves the necessary air distribution in a commercially used sauna such that infusion ceremonies can be performed with reduced personnel requirements and a similar or even improved sauna experience.

The problem is solved according to the disclosure in that the sauna with a sauna cabin and a sauna heater has at least one nozzle on or in a wall or ceiling of the sauna cabin and a compressed air supply, wherein the nozzle and the compressed air supply are adapted such that compressed air from the compressed air supply can be blown into the sauna cabin via the at least one nozzle.

Through the solution according to the disclosure, very targeted air blasts or airflows can be introduced into the sauna cabin, which are comparable in terms of the sauna experience to the air manipulation by a sauna master. Thus, the sauna according to the disclosure can reduce the personnel requirements for commercially used saunas without reducing the sauna experience of the customers.

Preferred configurations of the present disclosure are the subject of the sub-claims.

In a particularly preferred embodiment of the present disclosure, the at least one nozzle is a pivot nozzle, wherein the sauna comprises a device which comprises the at least one pivot nozzle and which is arranged on or in a wall or ceiling of the sauna cabin, wherein the device and the compressed air supply are adapted such that a reciprocating pivot movement of the pivot nozzle about a pivot axis can be executed. Thus, several seats can be reached by a device with an airflow and the air effect on the individual seats is not constant, but similar to that generated by a sauna master during air manipulation by means of, for example, a towel. Accordingly, this results in a particularly good sauna experience.

Preferably, the device is arranged on a wall of the sauna cabin. This makes the air effect more similar to the air manipulation by a sauna master.

Particularly preferably, the device has a receptacle with at least two pivot nozzles, which are connected to the compressed air supply, wherein the receptacle is attached to a mounting on or in the wall or ceiling of the sauna cabin such that the reciprocating pivot movement can be executed by the receptacle, wherein preferably a longitudinal axis of the receptacle lies parallel or congruent with the pivot axis. By using at least two pivot nozzles, the device can blow air over a larger area of the sauna cabin.

In this context, the nozzles are preferably arranged one above the other and the pivot axis is arranged vertically. This allows the device to be arranged parallel to or in the wall and the area blown over by the nozzles can be set precisely by adjusting the injection direction of the individual nozzles.

In a particularly preferred embodiment, the receptacle is connected to the compressed air supply via the mounting, wherein the mounting comprises an airflow drive configured such that it causes the reciprocating pivot movement of the receptacle when the mounting is supplied with compressed air. Thus, the compressed air supply simultaneously provides the pivot movement and no additional power or other supply is required to the device to cause the reciprocating pivot movement. Preferably, the airflow drive is temperature resistant. This allows the device to be configured without special insulation against the increased temperature in the sauna cabin. According to one embodiment of the airflow drive, it has a gear and a turbine wheel. The turbine wheel is driven by the compressed air, which in turn drives the gear, which then causes the reciprocating pivot movement of the receptacle.

According to another preferred embodiment, the reciprocating pivot movement of the receptacle can be executed by an electric motor on the mounting. The use of an electric motor is an alternative to the airflow drive. It can also be used to generate elaborate patterns of the reciprocating movement, which can be easily set by means of a control system for the electric motor.

Preferably, the mounting is accommodated in the wall and the electric motor has thermal insulation. This allows the electric motor to be protected from excessive temperatures, which simplifies the selection of a suitable electric motor.

According to another preferred embodiment, a pivot angle of the reciprocating pivot movement about the pivot axis is adjustable. This can be implemented equally by the airflow drive or the electric motor. By setting the pivot angle, the overblown area can be adjusted and set precisely even after the device has been installed.

In another preferred embodiment, the volume flow of compressed air per pivot nozzle is between 10 l/min and 50 l/min. This volume flow results in a particularly good sauna experience with efficient use of the compressed air. Preferably, the volume flow can be adjusted within this range so that special experiences of varying intensity can be generated.

In a further preferred embodiment, an alignment of the pivot nozzle relative to the receptacle can be changed at least in the direction of the pivot axis. This allows the area blown over by the device to be adjusted and set precisely after assembly.

According to a particularly preferred embodiment, the sauna has such a number of devices and they are distributed on or in the wall or ceiling such that an area above each seat of the sauna is hit at least once by the compressed air blown in from at least one pivot nozzle during the reciprocating pivot movement of the devices. As a result, the improved sauna experience is provided at each seat of the sauna cabin.

In another particularly preferred embodiment, the at least one nozzle is a ceiling nozzle, wherein the sauna has at least two ceiling nozzles, which are connected to the compressed air supply, are arranged on the ceiling of the sauna and their fixed injection directions are configured such that they have an adjustable angle to the ceiling of 0 to 45° and a circular rotation of the air occurs on the ceiling when compressed air is blown through the at least two ceiling nozzles. By using such ceiling nozzles, a high air turbulence of the air layer on the sauna cabin ceiling can be achieved, which has an extremely positive effect on the sauna experience, especially during and after the introduction of fresh air, which has a higher oxygen content than the air that is currently present in the sauna cabin. This is also a type of air manipulation that in commercial saunas is performed by the sauna master, and thus no longer needs to be performed by the sauna master due to this embodiment of the sauna.

Preferably, the sauna has at least three ceiling nozzles that are arranged in a circular pattern. This can additionally improve the air turbulence.

According to a particularly preferred embodiment, the sauna at least comprises a device with at least one pivot nozzle according to one of the embodiments described above and at least two ceiling nozzles according to one of the embodiments described above. By comprising at least one device with at least one pivot nozzle as well as at least two ceiling nozzles, a particularly good sauna experience can be achieved without requiring air manipulation by a sauna master.

In another particularly preferred embodiment, the sauna comprises an automatic infusion device that distributes fluid on a stone bed of the sauna heater. By using an automatic infusion device, there is no need for a sauna master for this step of an infusion ceremony, which without the infusion device would have required the sauna master to enter the sauna. Preferably, the automatic infusion device can be integrated into the sauna heater, ceiling or wall of the sauna.

In a preferred embodiment, the sauna has a control system that is adapted such that the automatic infusion device first distributes fluid on a stone bed of the sauna heater and the at least one nozzle then blows air into the sauna cabin. With such a sauna, an infusion ceremony can be performed without the entry of a sauna master in a commercially used sauna.

Preferably, the control system is adapted to first actuate the at least two ceiling nozzles, then the automatic infusion device, and then the device. This can further improve the sauna experience of an infusion ceremony that is performed without a sauna master entering the sauna.

In a further embodiment, the control system can be controlled from outside the sauna and/or is adapted such that the control system includes a timer by means of which the automatic infusion device and the at least one nozzle can be controlled. This is preferred for saunas which can be used commercially, since the sauna master can then perform an infusion ceremony without entering the sauna and, if a timer is used as part of the control system, he does not even have to operate the control system in order to have regular infusion ceremonies performed. In another embodiment, the control system can be activated via voice control. This enables particularly simple control of the sauna.

Furthermore, the present disclosure relates to a method for performing an automatic infusion ceremony for a sauna according to one of the above mentioned embodiments, comprising the following steps:

a) Ventilating the sauna with fresh air, which has a higher oxygen content than the air currently present in the sauna cabin;
b) Pouring infusion fluid onto a stone bed of a sauna heater by means of the automatic infusion device;
c) Distribution of humidified air rising above the sauna heater by means of at least one nozzle.

With such a method, the personnel requirements for commercially used saunas can be significantly reduced and users can nevertheless be offered equivalent infusion ceremonies. The fact that no sauna master has to enter the sauna can also increase the frequency of infusion ceremonies. Ventilation of the sauna with fresh air can inter alia be performed manually by a sauna master, wherein the sauna master opens the door and brings fresh air from outside the sauna into the sauna by means of a towel. In doing so, the sauna master does not have to enter the sauna, so that the sauna master is not exposed to the high temperatures of the sauna. In addition, fresh air can also be supplied through an additional access to the sauna cabin via a blower device or via the compressed air supply.

Preferably, the distribution of the humidified air rising above the sauna heater is carried out by means of the device according to one of the embodiments of the device described above. The use of the device provides a particularly good sauna experience.

Further preferably, during the ventilation of the sauna or between the ventilation and the infusion, the air is distributed on the ceiling by means of the at least two ceiling nozzles according to one of the configurations of the ceiling nozzles. This results in a particularly efficient distribution of fresh air within the sauna cabin, which leads to a particularly good sauna experience.

BRIEF DESCRIPTION OF THE DRAWINGS

In the following, an embodiment of the sauna according to the disclosure and a method according to the disclosure are explained in more detail with reference to drawings. In the drawings.

In the following Figures, identical parts are identified by the same reference signs. In so far as a Figure contains reference signs which are not explicitly referred to in the associated Figure description, reference is made to preceding or subsequent Figure descriptions.

DETAILED DESCRIPTION OF THE ENABLING EMBODIMENT

Figure 1:
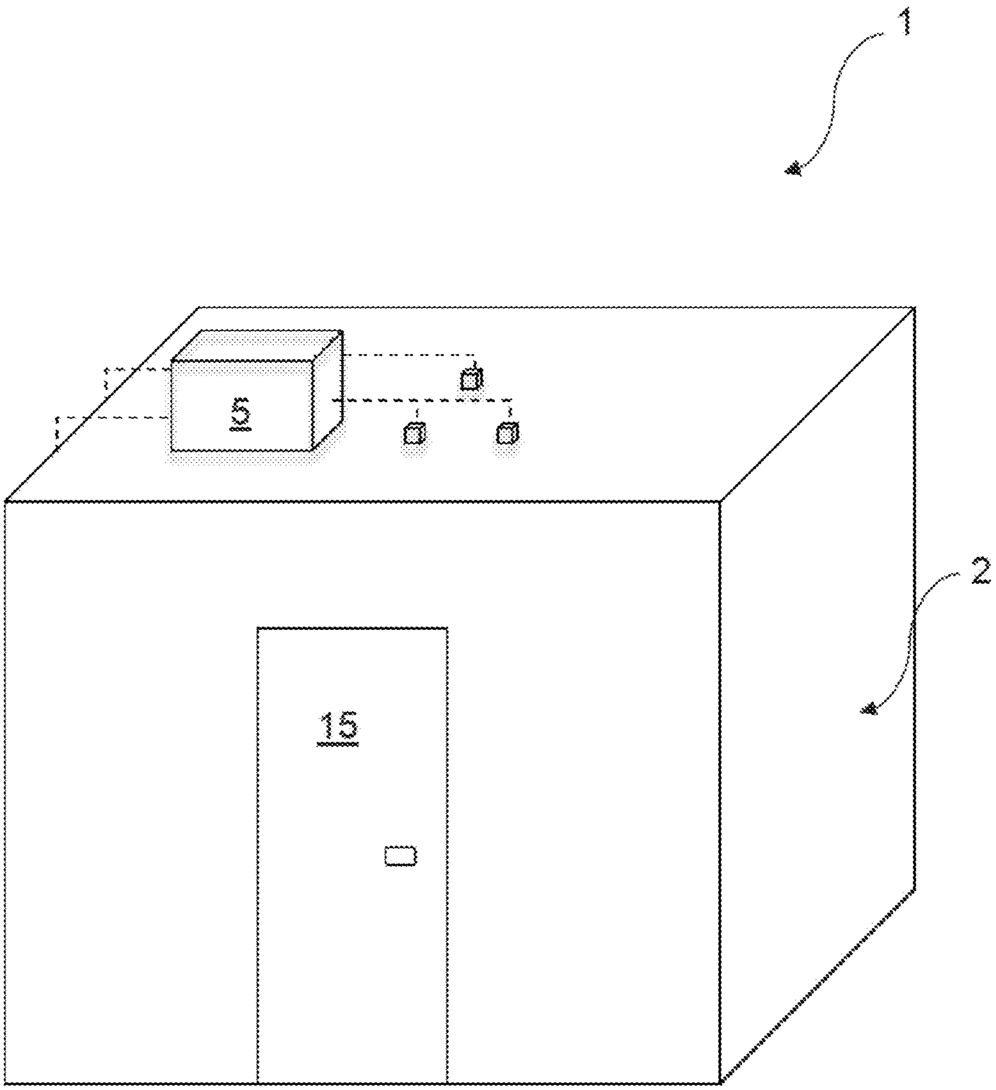
FIG. 1 shows a schematic view of an embodiment of the sauna from an oblique top view.
Figure 2:
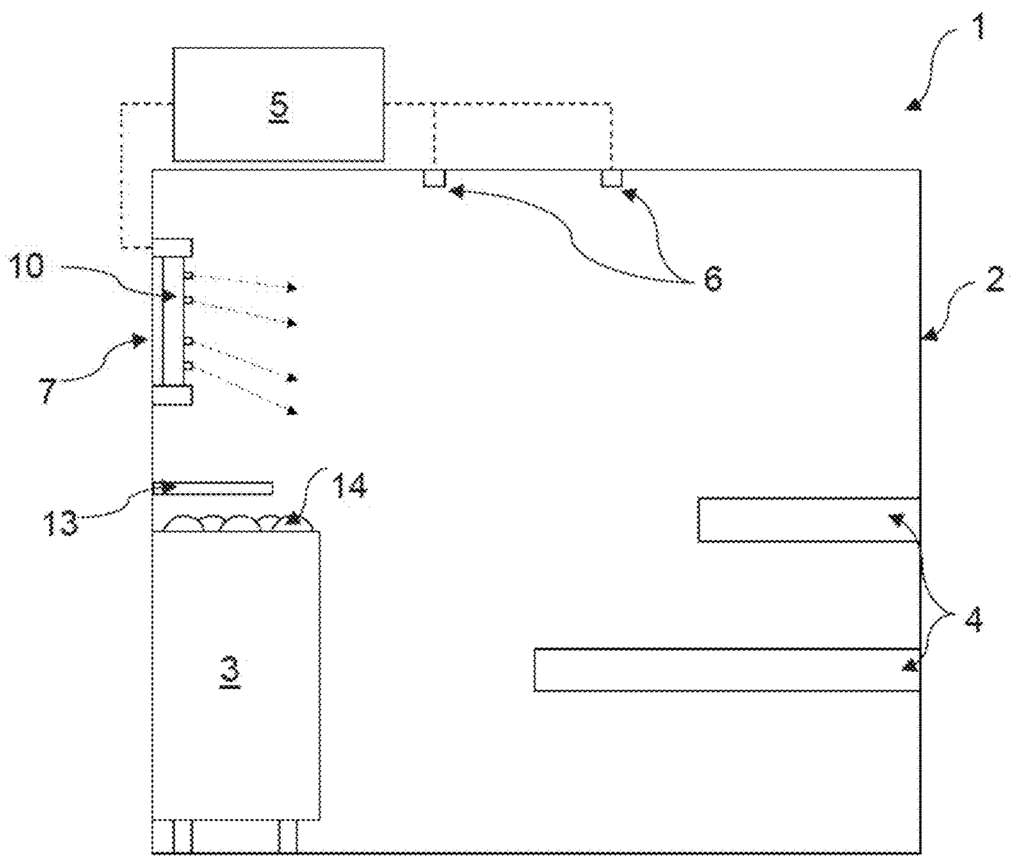
FIG. 2 shows a side view of the front side wall of the embodiment of the sauna without the front side wall.
Figure 3:
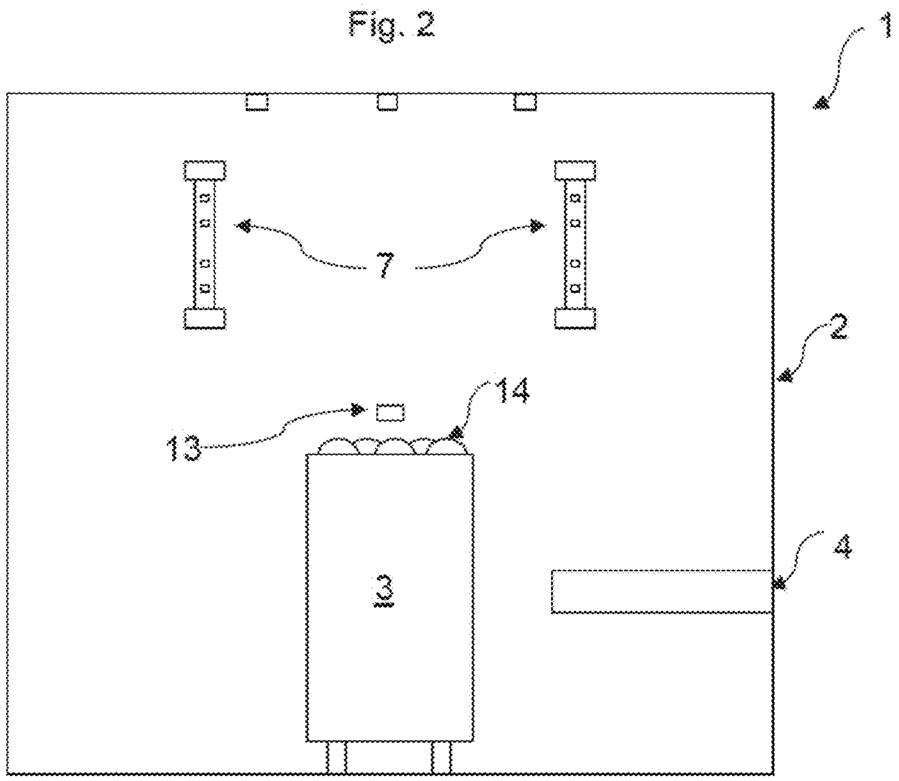
FIG. 3 shows a side view of the right side wall of the embodiment of the sauna without the right side wall.
Figure 4:
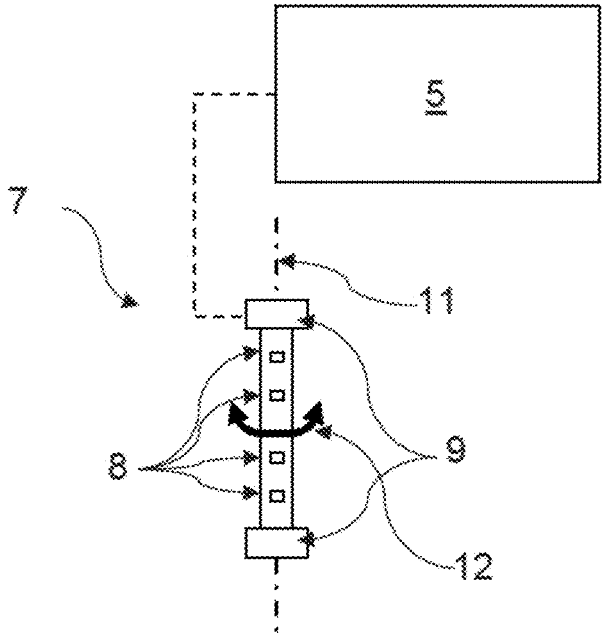
FIG. 4 shows a schematic illustration of the device of the embodiment of the sauna and the compressed air supply.

The embodiment of the sauna 1 according to the disclosure has a sauna cabin 2 with a sauna heater 3 and two sauna benches 4 arranged one above the other and a compressed air supply 5.

The compressed air supply 5 is connected to three ceiling nozzles 6 which are arranged on the ceiling of the sauna cabin 2 and to two devices 7 which are attached to a side wall of the sauna cabin 2 and each have four pivot nozzles 8.

The devices 7 comprise two mountings 9, which are attached to the side wall of the sauna cabin 2 and between which a receptacle 10 is arranged, on which the pivot nozzles 8 are arranged. The device 7 is thereby connected to the compressed air supply 5 via one of the mountings 9, wherein an airflow drive is contained in this mounting 9, which allows the receptacle 10 to perform a reciprocating pivot movement 12 about a pivot axis 11. In this context, the individual pivot nozzles 8 arranged on the receptacle 10 are each aligned at a different and adjustable angle with respect to the pivot axis 11 so that compressed air, which is fed to the devices from the compressed air supply 5, is blown over areas above the sauna benches 4 in a reciprocating pivot movement. By using the two devices 7, the entire area above the benches 4 can thus be blown over.

Figure 5:
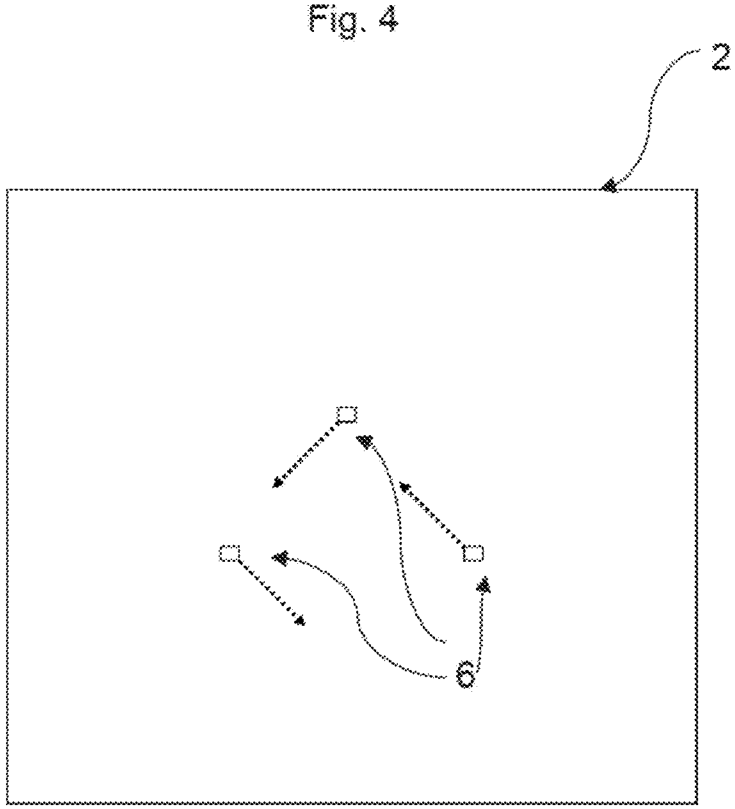
FIG. 5 shows a view of the ceiling of the sauna cabin of the embodiment of the sauna.

The three ceiling nozzles 6 arranged on the ceiling of the sauna cabin are aligned and connected to the compressed air supply 5 such that their injection direction, see FIG. 5, forms an airflow circuit on the ceiling. An angle of the injection direction of the ceiling nozzles 6 to the ceiling can be set between 0 and 45°.

In addition, the sauna 1 has an automatic infusion device 13, which is arranged above a stone bed 14 of the sauna heater 3 and can distribute infusion fluid over the stone bed 14.

Figure 6:
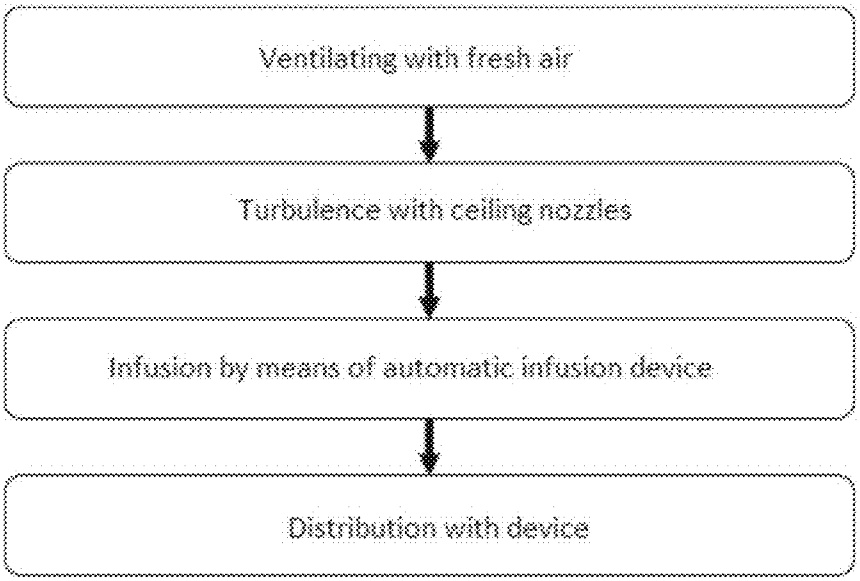
FIG. 6 shows a flow diagram of the method according to the disclosure.

With such a sauna 1, a variant of the method according to the disclosure as shown in FIG. 6 can be carried out, wherein the sauna 1 has a corresponding control system for this purpose, which in particular automatically carries out steps two to four. In the variant of the method according to the disclosure, as a first step the sauna cabin is ventilated with fresh air, wherein fresh air has a higher oxygen content than the air currently present in the sauna cabin 2. For this purpose, for example, the door 15 of the sauna cabin 2 can be opened and air can be introduced into the sauna cabin 2 by means of a towel. In the second step, the fresh air is moved via the ceiling nozzles 6 and distributed in the sauna cabin. Then, as the third step, the infusion is performed by means of the automatic infusion device 13, and lastly, as the fourth step, the heated humid air is distributed to the areas above the sauna benches 4 by the devices 7.

In the method, the individual steps, in particular steps two to four, can be set via the control system so that, for example, a more intensive turbulence with the ceiling nozzles 6, an infusion with more infusion fluid or a higher volume flow through the pivot nozzles 8 of the devices 7 can be set. Accordingly, different infusion ceremonies can be performed in an automated manner by the embodiment of the sauna 1 according to the disclosure without the need for a sauna master to enter the interior of the sauna cabin 2.

What is claimed is:

1. A sauna with a sauna cabin and a sauna heater, which has at least one nozzle on or in a wall or ceiling of the sauna cabin and a compressed air supply, wherein the nozzle and the compressed air supply are adapted such that compressed air from the compressed air supply can be blown into the sauna cabin via the at least one nozzle; and
- an automatic infusion device that distributes infusion fluid on a stone bed of the sauna heater.

2. The sauna according to claim 1, wherein the at least one nozzle is a pivot nozzle, wherein the sauna comprises a device which has the at least one pivot nozzle and which is arranged on or in a wall or ceiling of the sauna cabin, wherein the device and the compressed air supply are adapted such that a reciprocating pivot movement of the pivot nozzle about a pivot axis can be executed.

3. The sauna according to claim 2, wherein the device comprises a receptacle with at least two pivot nozzles which are connected to the compressed air supply, wherein the receptacle is attached to a mounting on or in the wall or ceiling of the sauna cabin such that the reciprocating pivot movement can be executed by the receptacle, wherein preferably a longitudinal axis of the receptacle lies parallel or congruent with the pivot axis.

4. The sauna according to claim 3, wherein the receptacle is connected to the compressed air supply via the mounting, wherein the mounting comprises an airflow drive which is configured such that it causes the reciprocating pivot movement of the receptacle when the mounting is supplied with compressed air.

5. The sauna according to claim 3, wherein the reciprocating pivot movement of the receptacle can be executed by an electric motor on the mounting.

6. The sauna according to claims 2, wherein the volume flow of compressed air per pivot nozzle is between 10 l/min and 50 l/min.

7. The sauna according to claim 3, wherein an alignment of the pivot nozzle relative to the receptacle is variable at least in the direction of the pivot axis.

8. The sauna according to claim 1, wherein the at least one nozzle is a ceiling nozzle, wherein the sauna comprises at least two ceiling nozzles which are connected to the compressed air supply, are arranged on the ceiling of the sauna and their fixed injection directions are configured such that they have an adjustable angle to the ceiling of 0 to 45° and a circular rotation of the air occurs on the ceiling when compressed air is blown through the at least two ceiling nozzles.

9. The sauna according to claim 2, further including a control system which is adapted such that the automatic infusion device first distributes fluid on the stone bed of the sauna heater and then the at least one nozzle blows air into the sauna cabin.

10. The sauna according to claim 9, wherein the control system is adapted to operate first the at least two ceiling nozzles, then the automatic infusion device and then the device.

11. A method of performing an automatic infusion ceremony for a sauna constructed according to claim 1, the method comprising the steps of:
- a) ventilating the sauna with fresh air, which has a higher oxygen content than the air currently present in the sauna cabin;
- b) pouring the infusion fluid onto the stone bed of the sauna heater by means of the automatic infusion device; and
- c) distribution of humidified air rising above the sauna heater by means of the at least one nozzle.

12. The method according to claim 11, wherein the sauna further comprises a device and wherein the distribution of the humidified air rising above the sauna heater is carried out by means of the at least one nozzle being a pivot nozzle which is arranged on or in a wall or ceiling of the sauna cabin and wherein the device and the compressed air supply are adapted such that a reciprocating pivot movement of the pivot nozzle about a pivot axis can be executed.

13. The method according to claim 11, wherein during the ventilation of the sauna or between the ventilation and the infusion, the air is distributed on the ceiling by means of at least two ceiling nozzles, the ceiling nozzles being connected to the compressed air supply and being arranged on the ceiling of the sauna, the ceiling nozzles having fixed injection directions that are configured to have an adjustable angle to the ceiling of 0 to 45° and wherein a circular rotation of the air occurs on the ceiling when compressed air is blown through the at least two ceiling nozzles.

14. The sauna according to claim 1, further including a control system which is adapted such that the automatic infusion device first distributes fluid on the stone bed of the sauna heater and then the at least one nozzle blows air into the sauna cabin.

15. A method of performing an automatic infusion ceremony for a sauna, comprising:

a) ventilating a sauna cabin of the sauna with fresh air having a higher oxygen content than air present in the sauna cabin;

b) distributing infusion fluid onto a stone bed of a sauna heater with an automatic infusion device; and c) distributing humidified air rising above the sauna heater within the sauna cabin with at least one nozzle.

16. The method of claim 15, further including blowing compressed air from a compressed air supply into the sauna cabin via the at least one nozzle.

17. The method of claim 16, further including configuring a control system to first distribute the infusion fluid via the automatic infusion device onto the stone bed of the sauna heater and then causing the blowing of compressed air from the compressed air supply into the sauna cabin via the at least one nozzle.

* * * * *